(12) United States Patent
Lin et al.

(10) Patent No.: US 11,833,530 B2
(45) Date of Patent: Dec. 5, 2023

(54) WATER OUTLET DEVICE AND SHOWER

(71) Applicant: Xiamen Solex High-Tech Industries Co., Ltd., Fujian (CN)

(72) Inventors: Fengde Lin, Fujian (CN); Donghai Chen, Fujian (CN); Bin Cao, Fujian (CN)

(73) Assignee: Xiamen Solex High-Tech Industries Co., Ltd., Fujian (CN)

( * ) Notice: Subject to any disclaimer, the term of this patent is extended or adjusted under 35 U.S.C. 154(b) by 122 days.

(21) Appl. No.: 17/574,366

(22) Filed: Jan. 12, 2022

(65) Prior Publication Data

US 2022/0226838 A1    Jul. 21, 2022

(30) Foreign Application Priority Data

Jan. 21, 2021   (CN) .......................... 202110081437.2

(51) Int. Cl.
  *B05B 1/18*  (2006.01)
  *F16K 11/16*  (2006.01)
  *B05B 1/16*  (2006.01)

(52) U.S. Cl.
  CPC .............. *B05B 1/18* (2013.01); *B05B 1/1609* (2013.01); *F16K 11/161* (2013.01)

(58) Field of Classification Search
  CPC ....... B05B 1/08; B05B 1/1609; B05B 1/1636; B05B 1/18; B05B 1/185; B05B 1/30; B05B 1/341; B05B 1/3421; B05B 12/002; F16K 11/161
  See application file for complete search history.

(56) References Cited

U.S. PATENT DOCUMENTS

| 2,999,647 | A | * | 9/1961 | Sosnick | ............... | B05B 1/3405 |
| | | | | | | 239/428 |
| 3,149,783 | A | * | 9/1964 | Sosnick | ............... | B05B 1/3033 |
| | | | | | | 239/491 |
| 9,943,863 | B2 | | 4/2018 | Huffington et al. | | |

(Continued)

FOREIGN PATENT DOCUMENTS

| CN | 208437056 U | 1/2019 |
| DE | 3828111 A1 | 2/1990 |

(Continued)

OTHER PUBLICATIONS

Corresponding European Patent Application No. 22152538.9, Search Report dated May 27, 2022.

(Continued)

*Primary Examiner* — Darren W Gorman
(74) *Attorney, Agent, or Firm* — COOPER LEGAL GROUP, LLC (57) ABSTRACT

The water outlet device comprises a water outlet component and a control mechanism, the water outlet component comprises a spherical chamber, a bottom of the spherical chamber comprises a water outlet hole, a top of the spherical chamber comprises a first water inlet, a side wall of the spherical chamber comprises a second water inlet, discharging water spray from the water outlet hole is controlled by flow rate variations of the first water inlet and the second water inlet, and the control mechanism cooperates with the first water inlet and the second water inlet to steplessly adjust the flow rate variations of the first water inlet and the second water inlet.

13 Claims, 7 Drawing Sheets

(56) References Cited

U.S. PATENT DOCUMENTS

| | | | |
|---|---|---|---|
| 2009/0236438 A1* | 9/2009 | Petrovic | B05B 7/0408 |
| | | | 239/398 |
| 2012/0175438 A1* | 7/2012 | Ji | B05B 7/0425 |
| | | | 239/601 |
| 2016/0082447 A1* | 3/2016 | Gong | F15D 1/0015 |
| | | | 239/461 |
| 2016/0318045 A1* | 11/2016 | Huffington | B05B 1/185 |
| 2017/0012026 A1 | 1/2017 | Choi | |
| 2017/0120261 A1 | 5/2017 | Zhou et al. | |
| 2017/0252758 A1* | 9/2017 | Lin | B05B 1/048 |
| 2018/0029049 A1 | 2/2018 | Hu et al. | |
| 2018/0243764 A1* | 8/2018 | Lin | B05B 1/169 |
| 2018/0318855 A1* | 11/2018 | Russell | B05B 1/18 |
| 2019/0201918 A1* | 7/2019 | Russell | B05B 1/185 |
| 2019/0283048 A1* | 9/2019 | Rong | B05B 1/1663 |

FOREIGN PATENT DOCUMENTS

| | | |
|---|---|---|
| EP | 3106231 A1 | 12/2016 |
| JP | H1-110854 U | 7/1989 |
| JP | 2002-17596 A | 1/2002 |
| JP | 3110519 U | 1/2005 |
| JP | 2008-119487 A | 5/2008 |

OTHER PUBLICATIONS

Corresponding Japanese Patent Application No. 2021-172519, Search Report dated Dec. 28, 2022.

Corresponding Japanese Patent Application No. 2021-172519, Decision to Grant a Patent dated Jan. 10, 2023.

\* cited by examiner

WATER OUTLET DEVICE AND SHOWER

RELATED APPLICATIONS

This application claims priority to Chinese Patent Application 202110081437.2, filed on Jan. 21, 2021. Chinese Patent Application 202110081437.2 is incorporated herein by reference.

FIELD OF THE DISCLOSURE

The present disclosure relates to a field of bathroom fixtures, and in particular relates to a water outlet device and a shower.

BACKGROUND OF THE DISCLOSURE

Existing water outlet devices comprise a water outlet component, a water inlet passage, two water dividing passages, and a control mechanism. The water outlet component comprises a first water outlet nozzle and a second water outlet nozzle, and the first water outlet nozzle and the second water outlet nozzle respectively discharge various water sprays. The two water dividing passages are respectively in communication with the first water outlet nozzle and the second water outlet nozzle. The control mechanism comprises a valve core and a driving mechanism. The driving mechanism is operatively connected to the valve core to drive the valve core to move, and the valve core is disposed between the water inlet passage and the two water dividing passages to switch the two water dividing passages to be in communication with the water inlet passage. Each existing water outlet nozzle can only produce a single water spray.

BRIEF SUMMARY OF THE DISCLOSURE

The present disclosure provides a water outlet device and a shower to overcome the disadvantages of the water outlet device of the existing techniques.

In order to solve the technical problem, a first technical solution of the present disclosure is as follows.

A water outlet device comprises a water outlet component and a control mechanism, the water outlet component comprises a spherical chamber, a bottom of the spherical chamber comprises a water outlet hole, a top of the spherical chamber comprises a first water inlet, a side wall of the spherical chamber comprises a second water inlet, discharging water spray from the water outlet hole is controlled by flow rate variations of the first water inlet and the second water inlet, and the control mechanism cooperates with the first water inlet and the second water inlet to steplessly adjust the flow rate variations of the first water inlet and the second water inlet.

In an embodiment, the water outlet device comprises a water inlet passage and two water dividing passages, the two water dividing passages are respectively in communication with the first water inlet and the second water inlet, and the control mechanism is disposed between the water inlet passage and the two water dividing passages.

In an embodiment, a variation between a cross-sectional area of the first water inlet and a cross-sectional area of the spherical chamber becomes larger as the first water inlet approaches the spherical chamber.

In an embodiment, a midmost point of the top of the spherical chamber comprises the first water inlet, and a midmost point of the bottom of the spherical chamber comprises the water outlet hole.

In an embodiment, the second water inlet is laterally disposed on an upper half of the side wall of the spherical chamber.

In an embodiment, an inner port of the second water inlet is tangentially disposed to discharge vortex water.

In an embodiment, the water outlet device comprises a control chamber, the control chamber is disposed between the water inlet passage and the two water dividing passages, the two water dividing passages each comprises a water dividing hole disposed on an inner chamber wall of the control chamber, the control mechanism comprises a valve core and a driving mechanism, the driving mechanism is operatively connected to the valve core and drives the valve core to move for stepless adjustment, the valve core has a valve sheet, the valve sheet movably abuts the inner chamber wall of the control chamber, and shuttered areas of the two water dividing holes are steplessly controlled to steplessly adjust flow rate variations of the two water dividing passages due to a movement of the valve sheet.

In an embodiment, the valve core comprises a driving shaft configured to be fixed relative to the valve sheet, the driving mechanism comprises a rotatable wheel, the rotatable wheel and the driving shaft are coaxially connected together to be configured to rotate synchronously, the inner chamber wall of the control chamber comprises an arc-shaped surface, the two water dividing holes are disposed on the arc-shaped surface and are circumferentially spaced, the valve sheet is an arc-shaped surface, and the valve sheet is rotatably connected to an inner side of the control chamber and cooperates with the arc-shaped surface of the inner chamber wall.

In an embodiment, the valve core comprises a rotatable plate mechanism and a driving shaft, the rotatable plate mechanism is configured to be rotatably connected to an inner side of the control chamber, the valve sheet is fixedly connected to the rotatable plate mechanism, the driving shaft is fixedly connected to the rotatable plate mechanism, positions of the two water dividing holes correspond to the valve sheet, and the driving mechanism is operatively connected to the driving shaft.

In an embodiment, the valve core comprises a driving shaft, the driving mechanism comprises a gear rack configured to slide, a push button configured to slide, and a first transmission gear and a speed reduction mechanism configured to rotate, the push button and the gear rack are fixedly connected together, the first transmission gear is engaged with the gear rack, and the speed reduction mechanism is operatively connected to the first transmission gear and the driving shaft.

In an embodiment, the driving mechanism comprises a second transmission gear and a third transmission gear, the first transmission gear is coaxially and fixedly connected to the second transmission gear, the second transmission gear is engaged with the third transmission gear, and the driving shaft is coaxially and fixedly connected to the third transmission gear.

In an embodiment, the water outlet device comprises a fixed base component, the water outlet component comprises a surface cover and a water divider, the water divider comprises an upper chamber of the spherical chamber, the surface cover comprises a lower chamber of the spherical chamber, the water divider and the surface cover are fixedly connected together, the upper chamber cooperates with the lower chamber to define the spherical chamber, a second water dividing chamber in communication with the second water inlet is defined between the water divider and the surface cover, the fixed base component is fixedly disposed on the water divider, a first water dividing chamber in communication with the first water inlet is defined between the fixed base component and the water divider, and the two water dividing passages respectively comprise the first water dividing chamber and the second water dividing chamber.

In an embodiment, a lower side the water divider protrudes to define a convex base, the convex base extends inward to define the upper chamber, an outer circumference of the convex base protrudes to define an annular convexity, the surface cover extends inward to define the lower chamber and further extends inward to define an annular groove surrounding the lower chamber, and the annular convexity cooperates with and is coupled to the annular groove.

In order to solve the technical problem, a second technical solution of the present disclosure is as follows.

A shower comprises the water outlet device, the shower comprises a hand-held part and a head part, the water outlet component is connected to the head part, and the control mechanism is disposed on the hand-held part.

Compared with existing techniques, the technical solution provided by the present disclosure has the following advantages.

The water outlet component comprises the spherical chamber. The bottom of the spherical chamber comprises the water outlet hole, the top of the spherical chamber comprises the first water inlet, and the side wall of the spherical chamber comprises the second water inlet. First, the first water flow from the first water inlet flows into the spherical chamber, and kinetic energy and flow speed are increased due to Bernoulli effect. When the water flow rushes into the spherical chamber, a small portion of the water flow will be adhered to a chamber wall of the spherical chamber due to wall-adherence effect, the water flow for wall-adherence in all directions varies at each water inflow moment due to turbulence instability and will impact a main waterway of the first water flow to deflect the main waterway when a flow rate for the wall-adherence is large. Therefore, a circumferentially oscillating pulsating water spray is generated, dynamic shaking water effect is achieved, water spray is fuller, discharging water is more uniform, and massaging feeling is remarkable. Second, the water flow can be discharged from a whole surface cover. Third, water spray from the water outlet hole is controlled by flow rate variations of the first water inlet and the second water inlet, so that a stepless variation of the water spray from the same water outlet hole is achieved.

When the first water inlet approaches the spherical chamber, a variation between a cross-sectional area of the first water inlet and a cross-sectional area of the spherical chamber becomes larger, and the Bernoulli effect is good.

The driving mechanism comprises the gear rack, the push button, the first transmission gear, and the speed reduction mechanism. The push button drives the gear rack to move and drives gears to rotate. The speed reduction mechanism drives the valve core to rotate and drives the valve core to rotate back and forth synchronously to make flow rates of the two water inlets change, so that the stepless variation of the water spray from the same water outlet hole is achieved.

The second water inlet is laterally disposed on the upper half of the side wall of the spherical chamber, so that vortex rotating water is generated when water flows into the spherical chamber.

The inner chamber wall of the control chamber comprises an arc-shaped surface, and the two water dividing holes are disposed on the arc-shaped surface and are disposed circumferentially. The valve sheet defines the arc-shaped surface. The valve sheet is rotatably connected to the inner side of the control chamber and cooperates with the arc-shaped surface of the inner chamber wall. The adjustment is convenient, and the structure is compact.

The water divider comprises the upper chamber of the spherical chamber, and the surface cover comprises the lower chamber of the spherical chamber. The water divider and the surface cover are fixedly connected together, and the upper chamber and the lower chamber cooperate to define the spherical chamber. The second water dividing chamber in communication with the second water inlet is defined between the water divider and the surface cover, and the first water dividing chamber in communication with the first water inlet is defined between the fixed base component and the water divider. The structure is compact, and the assembly is convenient.

BRIEF DESCRIPTION OF THE DRAWING

The present disclosure will be further described below with the combination of the accompanying drawings and the embodiments.

Reference numbers: water outlet component 11, control mechanism 12, water inlet passage 13, water dividing passages 14, control chamber 15, fixed base component 16, surface cover 17, water divider 18, spherical chamber 111, water outlet hole 112, first water inlet 113, second water inlet 114, water dividing hole 141, valve core 121, driving mechanism 122, valve sheet 1211, rotatable plate mechanism 1212, driving shaft 1213, gear rack 1221, push button 1222, first transmission gear 1223, second transmission gear 1224, third transmission gear 1225, second water dividing chamber 142, first water dividing chamber 143, water groove 161, fixed base 162, and sealing cover 163, upper chamber 181, convex base 182, annular convexity 183, lower chamber 171, annular groove 172, arc-shaped surface 151, main waterway A1, water flow A2, hand-held part B1, head part B2, mandrel B21, housing B12, decorative cover B11, and mounting body 10.

DETAILED DESCRIPTION OF THE EMBODIMENTS

Referring to FIGS. 1-8, a water outlet device comprises a water outlet component 11, a control mechanism 12, a water inlet passage 13, and two water dividing passages 14. The water outlet component 11 comprises a spherical chamber 111. A center of a bottom of the spherical chamber 111 comprises a water outlet hole 112, and a center of a top of the spherical chamber 111 comprises a first water inlet 113. The first water inlet 113 is directly opposite to the water outlet hole 112. When the first water inlet 113 approaches the spherical chamber 111, a sudden change between cross-sectional areas is large (i.e., a variation between a cross-sectional area of the first water inlet and a cross-sectional area of the spherical chamber becomes larger), and a cross-section of the first water inlet 113 is gradually enlarged in a downward direction. A first water flow from the first water inlet 113 flows into the spherical chamber 111, and kinetic energy and flow speed are increased due to Bernoulli effect. When water flow rushes into the spherical chamber 111, a small portion of a water flow A2 will be adhered to a chamber wall of the spherical chamber 111 due to wall-adherence effect. The water flow A2 for wall-adherence in all directions varies at each water inflow moment due to turbulence instability and will impact a main waterway A1 of the first water flow to deflect the main waterway A1 when a flow rate for the wall-adherence is large. Therefore, a circumferentially oscillating pulsating water spray is generated, dynamic shaking water effect is achieved, water spray is fuller, discharging water is more uniform, and massaging feeling is remarkable. A second water inlet 114 is laterally disposed on an upper half of a side wall of the spherical chamber 111, and an inner port of the second water inlet 114 is tangentially disposed to enable vortex water to be discharged. In addition, water spray from the water outlet hole 112 is controlled by flow rate variations of the first water inlet 113 and the second water inlet 114. The two water dividing passages 14 are respectively in communication with the first water inlet 113 and the second water inlet 114, and the control mechanism 12 is disposed between the water inlet passage 13 and the two water dividing passages 14 to steplessly adjust flow rate variations of the two water dividing passages 14, so that flow rate variations of the first water inlet 113 and the second water inlet 114 can be steplessly adjusted.

Figure 1:
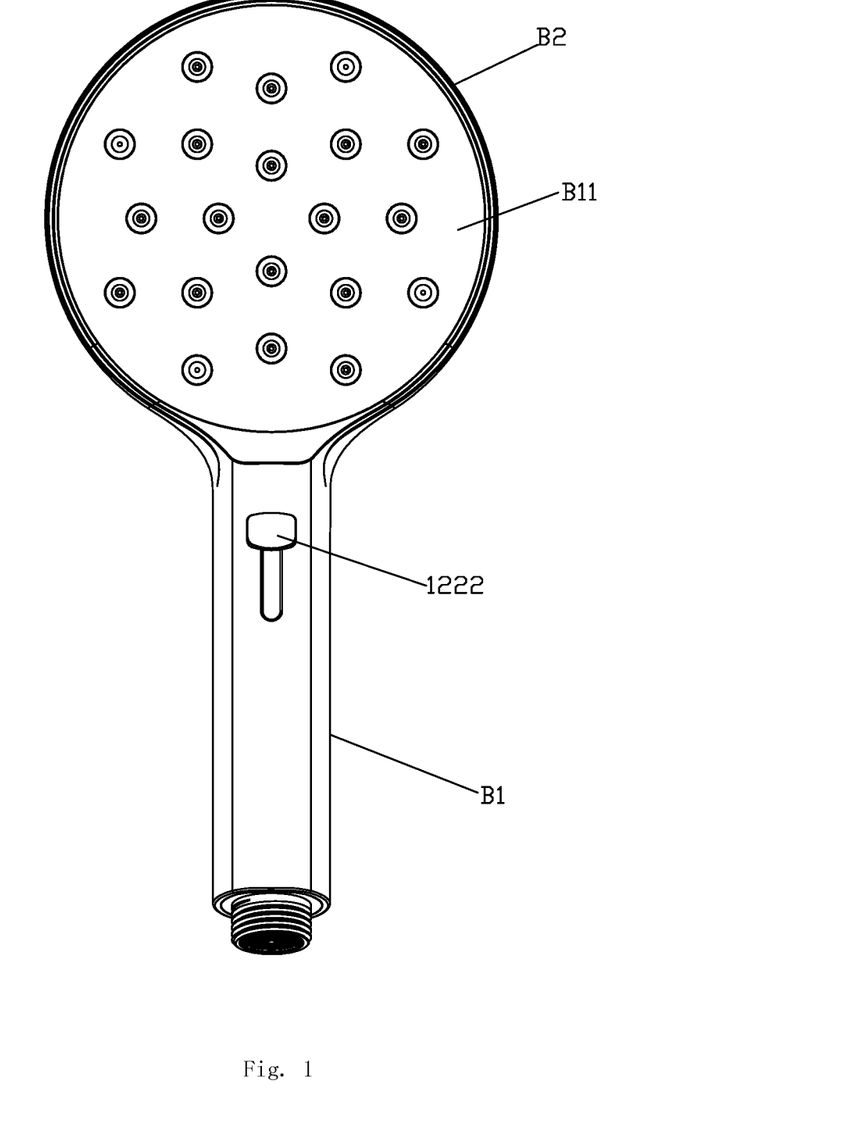
FIG. 1 illustrates a structural view of a shower of Embodiment 1.
Figure 2:
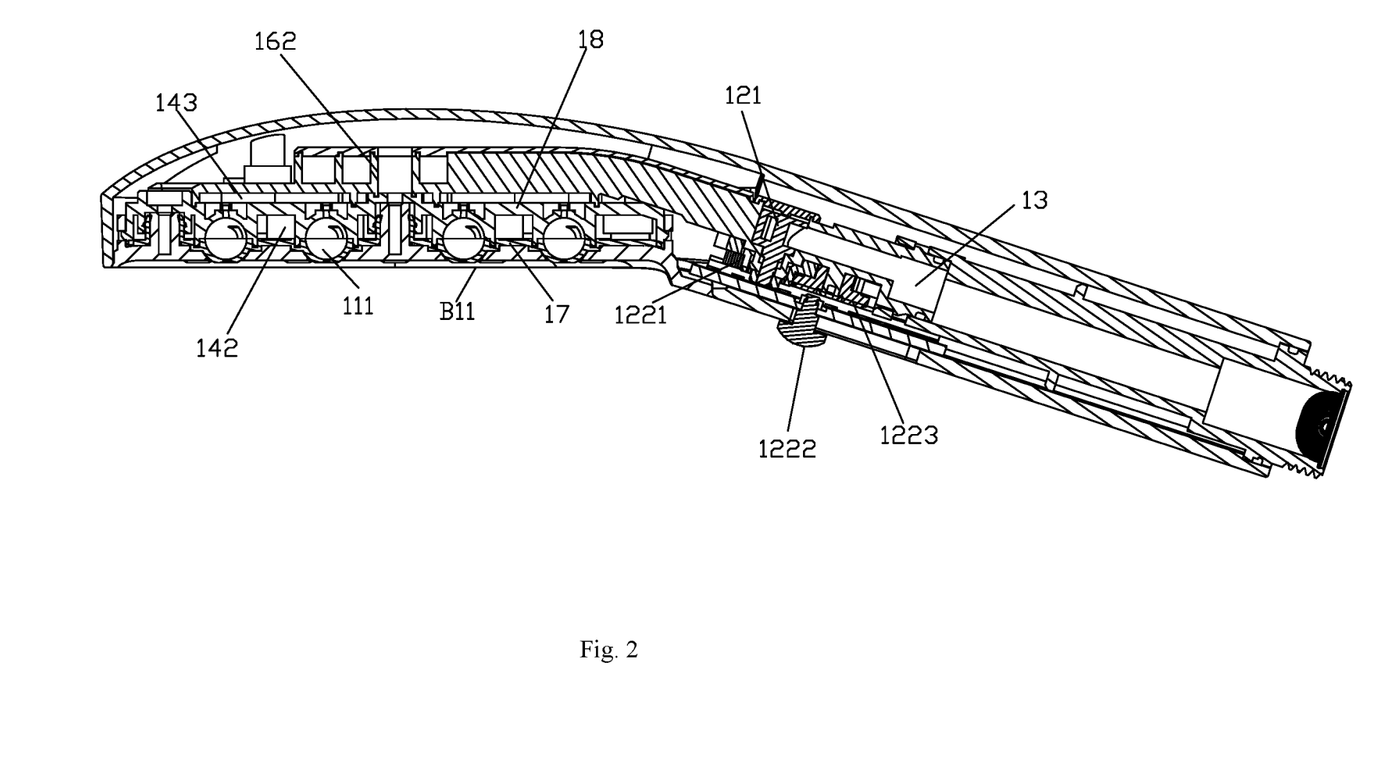
FIG. 2 illustrates a cross-sectional view of the shower of Embodiment 1.
Figure 3:
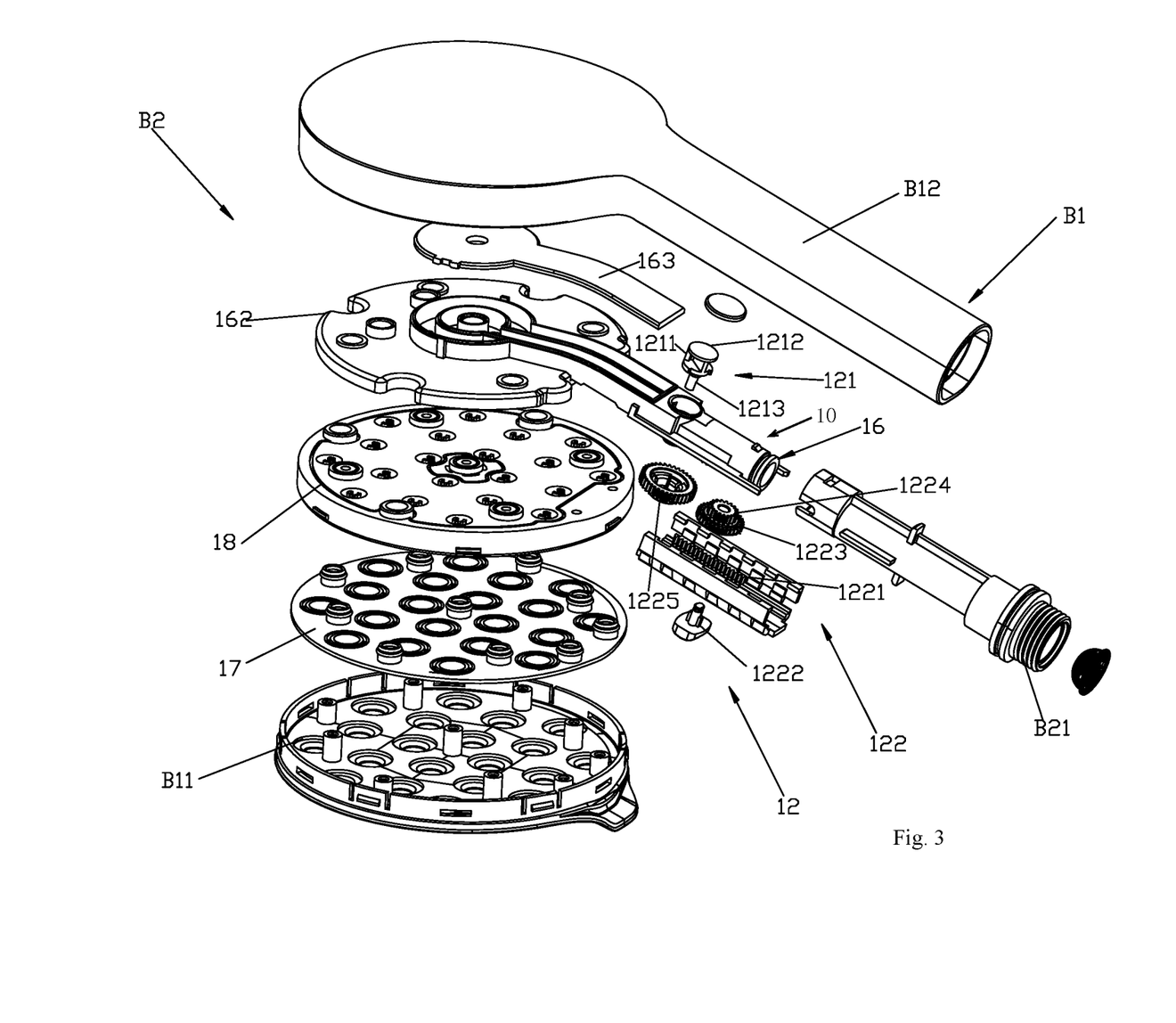
FIG. 3 illustrates an exploded perspective view of the shower of Embodiment 1.
Figure 4:
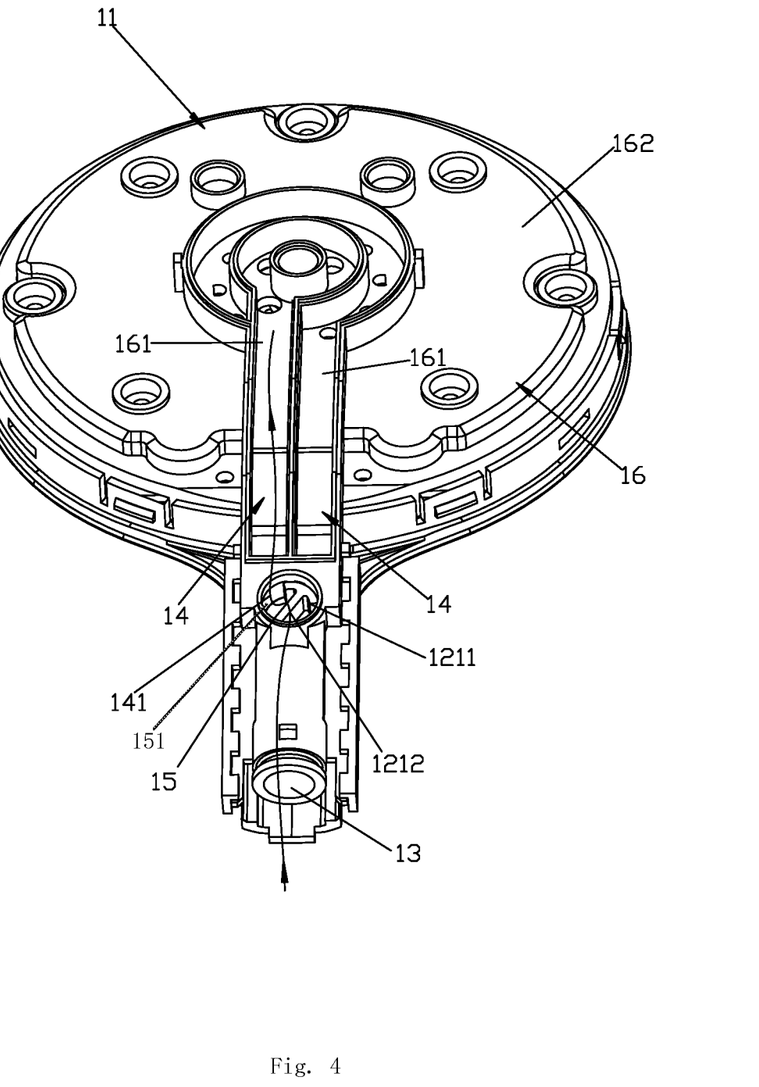
FIG. 4 illustrates a first perspective view of the water outlet device of Embodiment 1 when shaking spray water is discharged.
Figure 5:
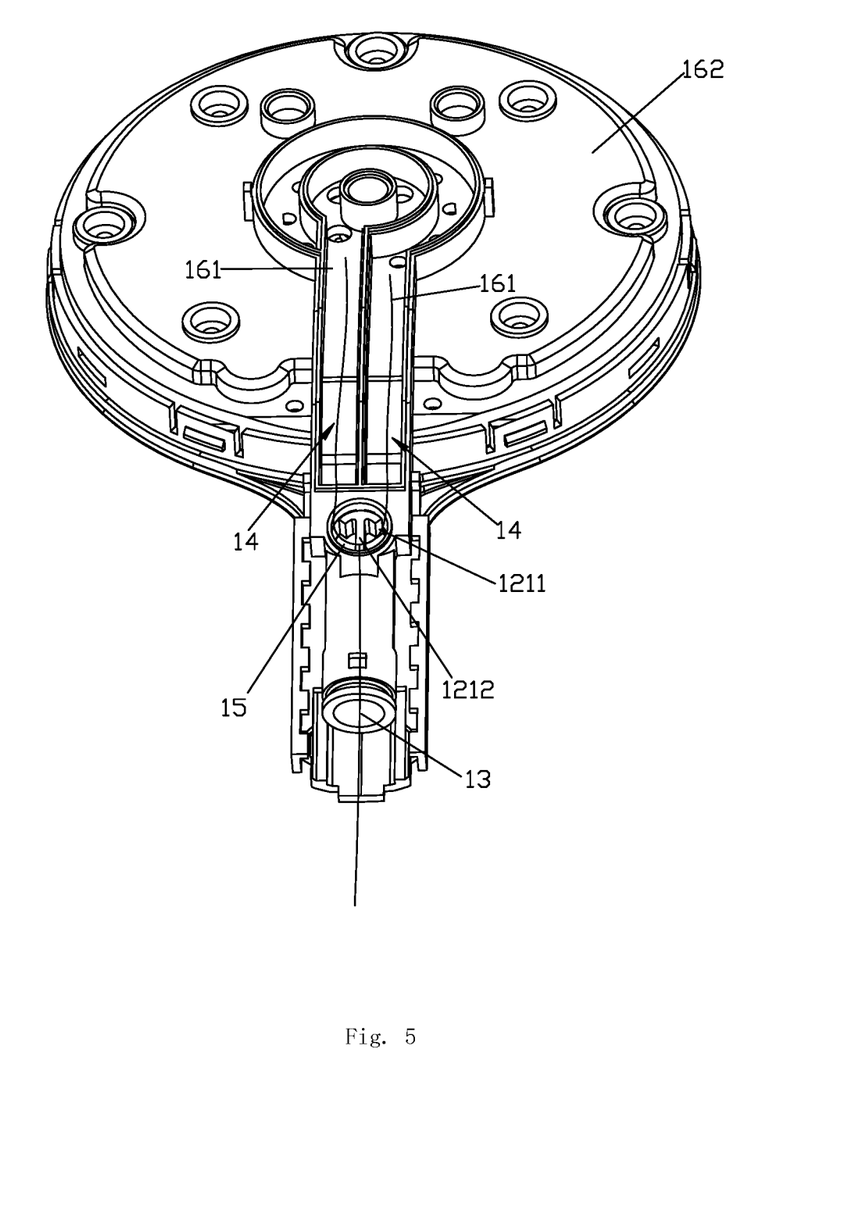
FIG. 5 illustrates a second perspective view of the water outlet device of Embodiment 1 when shaking particle-shaped water is discharged.
Figure 6:
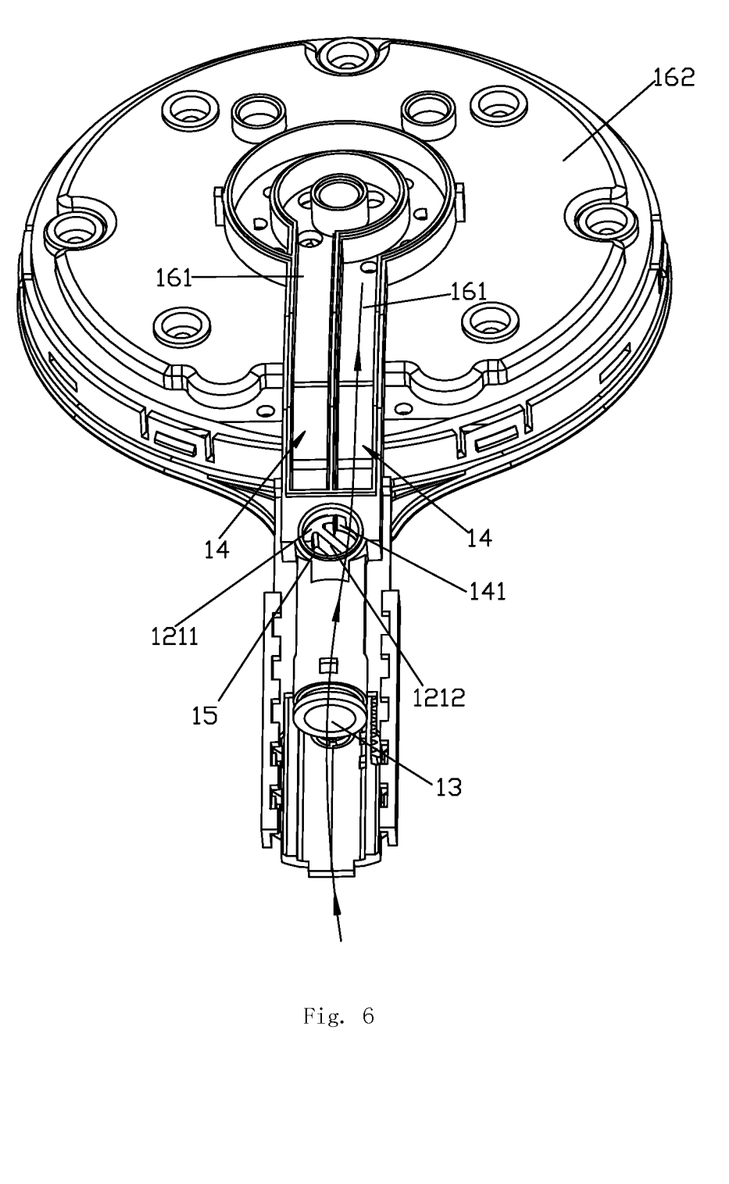
FIG. 6 illustrates a third perspective view of the water outlet device of Embodiment 1 when shaking column-shaped water is discharged.
Figure 7:
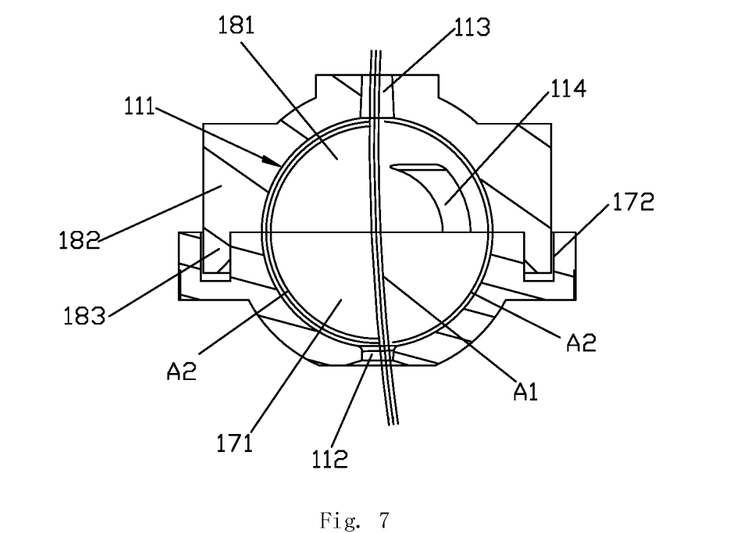
FIG. 7 illustrates a first structural view of a spherical chamber of the water outlet device of Embodiment 1 when a main passage of a first water flow is skewed to one side.
Figure 8:
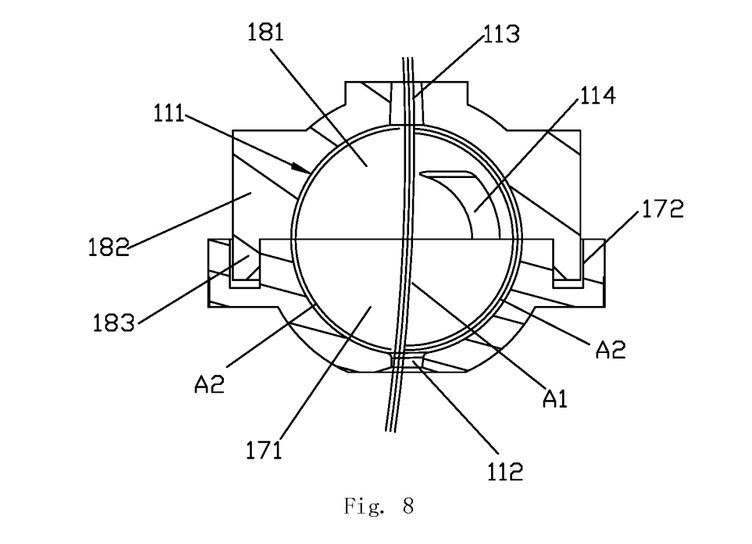
FIG. 8 illustrates a second structural view of the spherical chamber of the water outlet device in Embodiment 1 when the main passage of the first water flow is skewed to another side.

With respect to a stepless adjustment of a water spray, referring to FIGS. 4-6, shaking spray water, shaking particle-shaped water, and shaking column-shaped water (i.e., three different types of water spray patterns) are respectively discharged as follows. Referring to FIG. 4, a large portion of the water flows through the second water inlet 114 and a small portion of the water flows through the first water inlet 113. At this time, the shaking spray water is discharged. Referring to FIG. 5, the water flows through the first water inlet 113 and the second water inlet 114 concurrently. At this time, the shaking particle-shaped water (e.g., refined shaking particle-shaped water) is discharged (i.e., a water discharging mode comprises small lantern-shaped water). Referring to FIG. 6, a large portion of the water flows through the first water inlet 113 and a small portion of the water flows through the second water inlet 114. At this time, the shaking column-shaped water is discharged. The water outlet device discharges dynamic sprays, and a larger coverage (one nozzle corresponds to multiple points using shaking) can be achieved using fewer spray particles. When bathing needs are met, the water outlet nozzles can be appropriately reduced, so that a shower can be steplessly switched to an atomized water state (e.g., the shaking spray water state) and defines a larger spray angle under low pressure.

The water outlet device comprises a control chamber 15, and the control chamber 15 is disposed between the water inlet passage 13 and the two water dividing passages 14. An inner chamber wall of the control chamber 15 comprises an arc-shaped surface 151, and the two water dividing passages 14 both comprise a water dividing hole 141 disposed on the arc-shaped surface 151. The control mechanism 12 comprises a valve core 121 and a driving mechanism 122. The valve core 121 comprises a valve sheet 1211, a rotatable plate mechanism 1212, and a driving shaft 1213. The valve sheet 1211 defines an arc-shaped surface, and the valve sheet 1211 is fixedly connected to a side edge of the rotatable plate mechanism 1212. The driving shaft 1213 is fixedly connected to an axis position of the rotatable plate mechanism 1212 (i.e., an axis about which the rotatable plate mechanism 1212 rotates). The rotatable plate mechanism 1212 is configured to be rotatably connected to an inner side of the control chamber 15. The valve sheet 1211 cooperates and abuts the arc-shaped surface 151 of the inner chamber wall, and shuttered areas of the two water dividing holes 141 are steplessly controlled to steplessly adjust flow rate variations of the two water dividing passages 14 due to a movement of the valve sheet 1211. The driving mechanism 122 comprises a gear rack 1221 configured to be slidably connected to a mounting body 10 to be slidable, a push button 1222 configured to be slidably connected to the mounting body 10 to be slidable, and a first transmission gear 1223, a second transmission gear 1224, and a third transmission gear 1225 configured to rotatably connected to the mounting body 10 to be rotatable. The push button 1222 and the gear rack 1221 are fixedly connected together, and the first transmission gear 1223 is engaged with the gear rack 1221. The first transmission gear 1223 is coaxially and fixedly connected to the second transmission gear 1224, and the second transmission gear 1224 is engaged with the third transmission gear 1225. The driving shaft 1213 is coaxially and fixedly connected to the third transmission gear 1225, and the second transmission gear 1224 cooperates with the third transmission gear 1225 to define a speed reduction mechanism to achieve speed reduction. The third transmission gear 1225 defines a rotatable wheel configured to drive the driving shaft 1213 to rotate. Therein, a sealing gasket does not need to be disposed between the two water dividing passages 14 due to a stepless adjustment of the flow rate variations of the two water dividing passages 14, so that a switching force is mild and a current switching force is less than 2 N.

The water outlet device further comprises a fixed base component 16. The water outlet component 11 comprises a surface cover 17 and a water divider 18. The water divider 18 comprises an upper chamber 181 of the spherical chamber 111. The surface cover 17 comprises a lower chamber 171 of the spherical chamber 111, and the water divider 18 and the surface cover 17 are fixed together. The upper chamber 181 and the lower chamber 171 cooperate to form the spherical chamber 111. A second water dividing chamber 142 in communication with the second water inlet 114 is defined between the water divider 18 and the surface cover 17. The fixed base component 16 is fixed to the water divider 18, and a first water dividing chamber 143 in communication with the first water inlet 113 is defined between the fixed base component 16 and the water divider 18. The fixed base component 16 comprises a fixed base 162 comprising water grooves 161 connected in parallel and extending inward from a top surface of the fixed base 162 and comprises a sealing cover 163 hermetically connected to the fixed base 162 to close groove openings of the water grooves 161. The water grooves 161 (e.g., two water grooves 161) are respectively in communication with the first water dividing chamber 143 and the second water dividing chamber 142 through holes. The two water dividing passages 14 respectively comprise the water grooves 161 and the water dividing chambers (e.g., the second water dividing chamber 142 or the first water dividing chamber 143). The water inlet passage 13, part of the two water dividing passages 14, and the control mechanism 12 are all disposed on the fixed base component 16. In detail, a lower side of the water divider 18 protrudes to define a convex base 182, the convex base 182 extends inward to define the upper chamber 181, and an outer circumference of the convex base 182 protrudes to define an annular convexity 183. The surface cover 17 extends inward to define the lower chamber 171 and extends inward to define an annular groove 172 surrounding the lower chamber 171 (i.e., each lower chamber 171), and the annular convexity 183 cooperates with and is coupled to the annular groove.

A shower comprising the water outlet device comprises a hand-held part B1 and a head part B2. The water outlet component 11 is connected to the head part B2, and the control mechanism 12 is disposed on the hand-held part B1. A mandrel B21, a housing B12, and a decorative cover B11 are further provided. The mandrel B21 is in communication with the water inlet passage 13, and the water outlet device is disposed in the housing B12. The decorative cover B11 is disposed on the surface cover 17, and the mounting body 10 comprises the fixed base component 16 and the mandrel B21.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:
1. A water outlet device, comprising:
a water outlet component,
a water inlet passage,
two water dividing passages, and
a valve core, wherein:
the water outlet component comprises a spherical chamber,
a bottom of the spherical chamber comprises a water outlet hole,
a top of the spherical chamber comprises a first water inlet,
a side wall of the spherical chamber comprises a second water inlet,
discharging water spray from the water outlet hole is controlled by flow rate variations of the first water inlet and the second water inlet,
the two water dividing passages are respectively in communication with the first water inlet and the second water inlet, and
the valve core is disposed between the water inlet passage and the two water dividing passages to cooperate with the first water inlet and the second water inlet to steplessly adjust the flow rate variations of the first water inlet and the second water inlet.
2. The water outlet device according to claim 1, wherein a variation between a cross-sectional area of the first water inlet and a cross-sectional area of the spherical chamber becomes larger as the first water inlet approaches the spherical chamber.

3. The water outlet device according to claim 1, wherein:
a midmost point of the top of the spherical chamber comprises the first water inlet, and
a midmost point of the bottom of the spherical chamber comprises the water outlet hole.
4. The water outlet device according to claim 1, wherein the second water inlet is laterally disposed on an upper half of the side wall of the spherical chamber.
5. The water outlet device according to claim 1, wherein an inner port of the second water inlet is tangentially disposed to discharge vortex water.
6. The water outlet device according to claim 1, comprising:
a control chamber, wherein:
the control chamber is disposed between the water inlet passage and the two water dividing passages,
the two water dividing passages each comprises a water dividing hole disposed on an inner chamber wall of the control chamber,
a control mechanism comprises the valve core and a driving mechanism,
the driving mechanism is operatively connected to the valve core and drives the valve core to move for stepless adjustment,
the valve core has a valve sheet,
the valve sheet movably abuts the inner chamber wall of the control chamber, and
shuttered areas of the two water dividing holes are steplessly controlled to steplessly adjust flow rate variations of the two water dividing passages due to a movement of the valve sheet.
7. The water outlet device according to claim 6, wherein:
the valve core comprises a driving shaft configured to be fixed relative to the valve sheet,
the driving mechanism comprises a rotatable wheel,
the rotatable wheel and the driving shaft are coaxially connected together to be configured to rotate synchronously,
the inner chamber wall of the control chamber comprises an arc-shaped surface,
the two water dividing holes are disposed on the arc-shaped surface and are circumferentially spaced,
the valve sheet is an arc-shaped surface, and
the valve sheet is rotatably connected to an inner side of the control chamber and cooperates with the arc-shaped surface of the inner chamber wall.
8. The water outlet device according to claim 6, wherein:
the valve core comprises a rotatable plate mechanism and a driving shaft,
the rotatable plate mechanism is configured to be rotatably connected to an inner side of the control chamber,
the valve sheet is fixedly connected to the rotatable plate mechanism,
the driving shaft is fixedly connected to the rotatable plate mechanism,
positions of the two water dividing holes correspond to the valve sheet, and
the driving mechanism is operatively connected to the driving shaft.
9. The water outlet device according to claim 6, wherein:
the valve core comprises a driving shaft,
the driving mechanism comprises a gear rack configured to slide, a push button configured to slide, and a first transmission gear and a speed reduction mechanism configured to rotate,
the push button and the gear rack are fixedly connected together, the first transmission gear is engaged with the gear rack, and the speed reduction mechanism is operatively connected to the first transmission gear and the driving shaft.

10. The water outlet device according to claim 9, wherein:

the speed reduction mechanism comprises a second transmission gear and a third transmission gear, the first transmission gear is coaxially and fixedly connected to the second transmission gear, the second transmission gear is engaged with the third transmission gear, and the driving shaft is coaxially and fixedly connected to the third transmission gear.

11. The water outlet device according to claim 1, comprising:

a fixed base component, wherein:

the water outlet component comprises a surface cover and a water divider, the water divider comprises an upper chamber of the spherical chamber, the surface cover comprises a lower chamber of the spherical chamber, the water divider and the surface cover are fixedly connected together, the upper chamber cooperates with the lower chamber to define the spherical chamber, a second water dividing chamber in communication with the second water inlet is defined between the water divider and the surface cover, the fixed base component is fixedly disposed on the water divider, a first water dividing chamber in communication with the first water inlet is defined between the fixed base component and the water divider, and the two water dividing passages respectively comprise the first water dividing chamber and the second water dividing chamber.

12. The water outlet device according to claim 11, wherein:

a lower side the water divider protrudes to define a convex base, the convex base extends inward to define the upper chamber, an outer circumference of the convex base protrudes to define an annular convexity, the surface cover extends inward to define the lower chamber and further extends inward to define an annular groove surrounding the lower chamber, and the annular convexity cooperates with and is coupled to the annular groove.

13. A shower, comprising:

the water outlet device according to claim 1, wherein:

the shower comprises a hand-held part and a head part, the water outlet component is connected to the head part, and the valve core is disposed on the hand-held part.

* * * * *